DENNIS W. CAMP
ROBERT E. TURNER
INVENTOR.(S)

ATTORNEYS

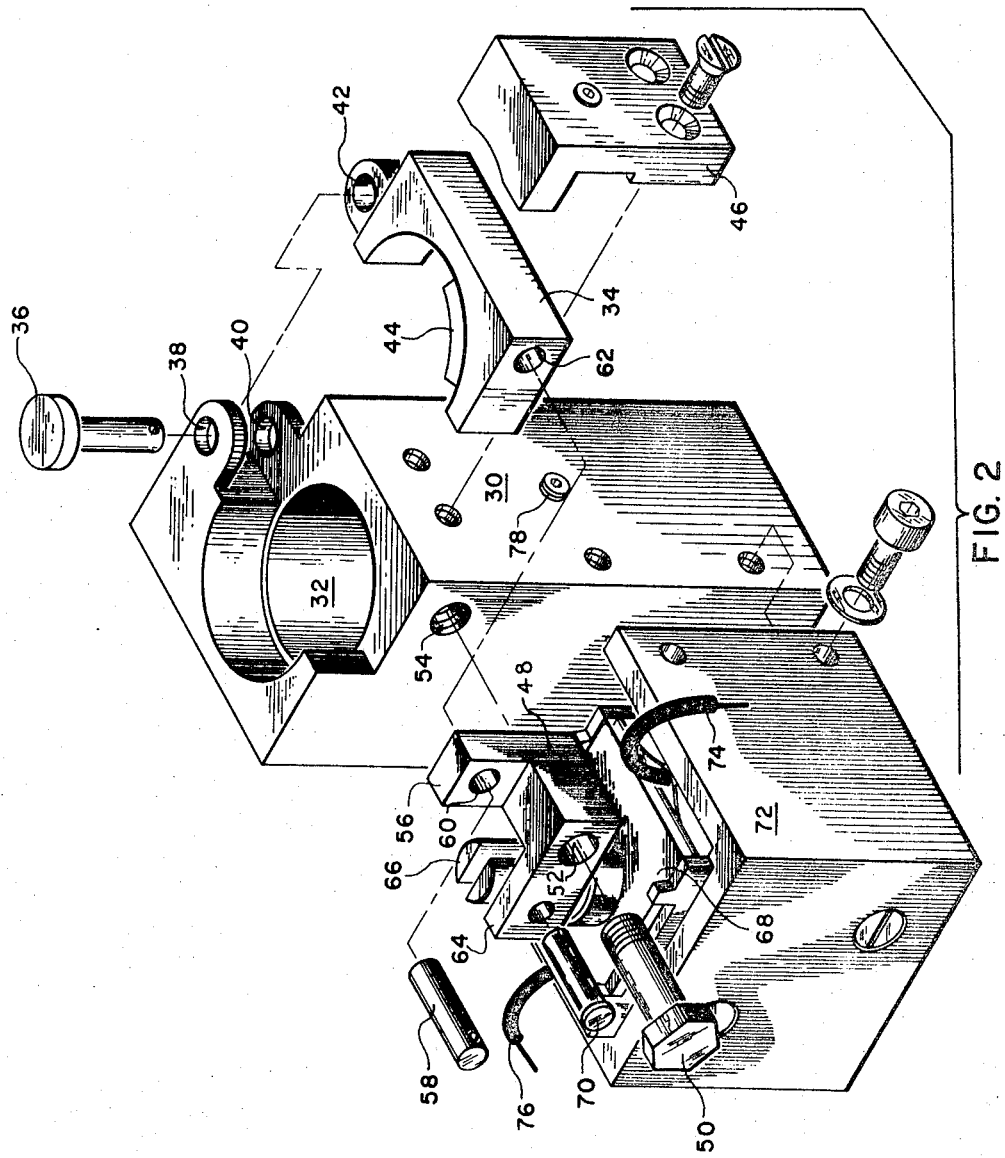

United States Patent Office 3,465,584
Patented Sept. 9, 1969

3,465,584
ANEMOMETER WITH BRAKING MECHANISM
Robert E. Turner and Dennis W. Camp, Huntsville, Ala., assignors to the United States of America as represented by the Administrator of the National Aeronautics and Space Administration
Filed Aug. 15, 1967, Ser. No. 660,842
Int. Cl. G01w 1/02
U.S. Cl. 73—189                                                  6 Claims

ABSTRACT OF THE DISCLOSURE

An anemometer having a wind driven member mounted on a shaft journaled for rotation in a cylindrical base, and a braking mechanism positioned on the base for engagement with the shaft to stop movement of the wind driven member. The braking mechanism includes a housing, a brake lever and solenoid mounted on the housing and a linkage connecting the solenoid and brake lever whereby the brake lever can be pivoted to a position of engagement with the shaft journaled for rotation in the base.

BACKGROUND OF THE INVENTION

The invention described herein was made by employees of the United States Government and may be manufactured and used by or for the Government for governmental purposes without the payment of any royalty thereon or therefor.

The invention described herein relates in general to an anemometer and more particularly the invention relates to an anemometer that includes a braking mechanism to prevent rotation of wind driven elements normally found in anemometers.

An anemometer is an instrument for measuring wind force and there are various types of anemometers available. The anemometer type to which this invention pertains is that which uses wind cups or other wind driven members mounted on a rotatable shaft. The shaft is journaled in a base that includes apparatus capable of monitoring shaft rotation and generating an electric signal that provides an indication of wind speed.

Anemometers available heretofore were not provided with any type of braking mechanism for controlling the rotation of the wind driven cups or other rotating parts. There are occasions when it is desirable to be able to stop the rotating parts of an anemometer even though the anemometer is positioned in flowing air. For example, in testing the response characteristics of various types of anemometers in a wind tunnel, one of the test procedures used is to hold the rotating parts of the anemometer stationary while bringing the wind tunnel up to a desired equilibrium speed. The rotating parts of the anemometer are then released and the time required by the anemometer to come up to speed is measured. Anemometers available heretofore did not have any provision for braking and thus it has been necessary to improvise a method of immobilizing the rotating parts of the anemometer.

A procedure commonly used in testing the response time of an anemometer in wind tunnel flow has been to place the anemometer in a wind tunnel, tape the rotatable shaft of the anemometer to prevent rotation hereof and then attach a line or string to the tape and run the line outside of the wind tunnel. The tunnel would then be closed and air flow brought to an equilibrium speed, and the line pulled to remove the tape, so as to allow the anemometer to come up to equilibrium speed. It is believed readily apparent that this procedure is quite tedious and time consuming, particularly when it is considered that several minutes at least are required for a wind tunnel to reach equilibrium conditions after each opening thereof to immobilize the rotating parts of the anemometer being tested.

SUMMARY OF THE INVENTION

An anemometer constructed in accordance with the principles described herein avoids the disadvantages of the prior art discussed above. This is accomplished by providing a braking mechanism which is mounted on an anemometer so that it can be selectively actuated to engage and immobilize the rotating parts thereof. The braking mechanism includes an outer housing that is mounted on the base or stationary part of an anemometer and the housing also surrounds at least a portion of the rotating parts of the anemometer. The housing has a brake lever pivotally mounted thereon which can be actuated to a position of engagement with the rotating portions of the anemometer. The brake lever has a brake pad fixed thereto. The brake lever is biased to a position of engagement with the rotating parts of the anemometer by a solenoid which is mounted to the housing and connection to the brake lever by a linkage. The solenoid would of course be provided with electrical connections extending to a switch positioned outside the tunnel.

BRIEF DESCRIPTION OF THE DRAWINGS

FIGURE 2 is an exploded view of the braking mechanism removed from the anemometer.

DETAILED DESCRIPTION OF THE INVENTION

Figure 1:
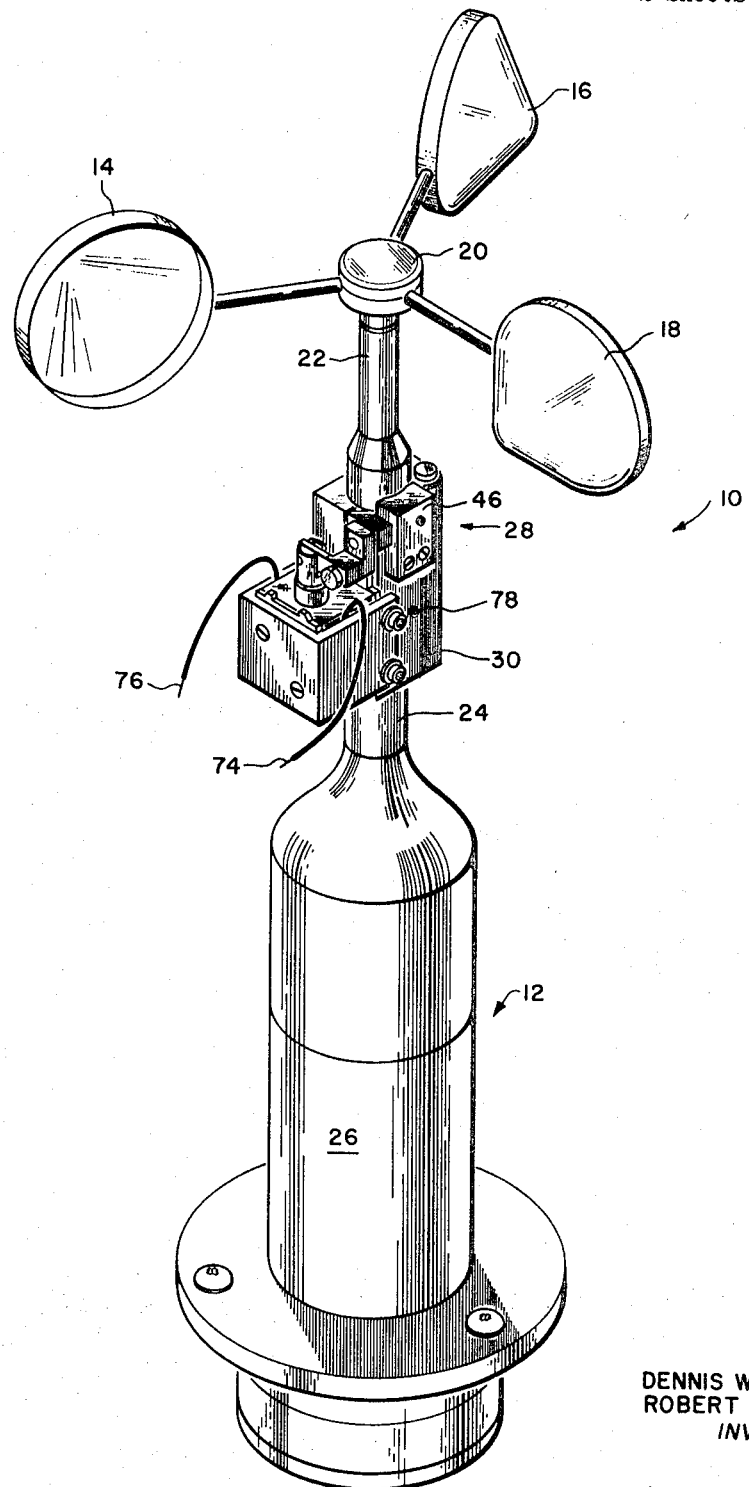
FIGURE 1 is a pictorial view of an anemometer and braking mechanism therefor.

Referring now to FIGURE 1 of the drawing which illustrates an anemometer 10 that consists of a base 12, a set of three wind cups 14, 16, and 18 attached to a cap 20 which is in turn mounted on rotatable shaft 22. The rotatable shaft is journaled in the upper neck portion 24 of base 12. The rotation of shaft 22 is monitored by suitable electronic apparatus housed within bottom portion 26 of base 12. The electrical apparatus used to monitor the rotation of shaft 22 is of a conventional type and therefore not discussed or illustrated in detail herein.

A braking mechanism 28 for selectively immobilizing the rotating shaft is mounted upon the neck portion 24 of the base 12 and extends upwardly so as to surround the lower portion of rotating shaft 22.

The braking mechanism consists of, see FIGURE 2, a housing 30 having a central bore 32 adapted to fit over the neck portion 24 of base 12. Housing 30 has a brake shoe or brake lever 34 pivotally mounted thereon by means of a pin 36 which fits into apertures 38 and 40 in housing 30 and also through an aperature 42 formed on the brake lever 34. The brake lever has a brake pad 44 bonded thereto and this brake pad engages the lower portion of rotating shaft 22 when the brake lever is actuated, by means discussed hereafter. The outward or counter-clockwise pivotal movement of the brake lever 34 is limited by a stop 46 bolted to housing 30. Brake lever 34 is biased to a position of engagement with the rotating shaft by a pivotally mounted link 48 which is pivotally attached to housing 30 by means of bolt 50 which fits through opening 52 in link 48 and screws into threaded hole 54 formed in housing 30. Link 48 has an upwardly projecting arm 56 that is pinned to brake lever 34 by a pin 58 which fits into openings 60 and 62 formed in the link and brake lever. The fit between pin 58 and the walls of openings 60 and 62 are such as to permit rotational movement between link 48 and brake lever 34. A second projecting portion 64 of link 48 is attached to plunger 66 of a solenoid 68. Portion 64 of link 48 is attached to the solenoid plunger by means of a pin 70. The solenoid is mounted to a frame 72 which is in turn bolted to housing 30 so as to position the solenoid in proper alignment with link 48. Solenoid 68 has electrical leads 74 and 76 connected thereto. These leads are normally connected to a suitable switch means and power source for actuation of the solenoid.

The operation of the device with the braking mechanism properly positioned with respect to portion 24 of the base and clamped in this position by means of a setscrew 78 is as follows. The brake lever 34 is normally biased outwardly, out of engagement with the rotating shaft by plunger 66 of the solenoid and link 48. The solenoid plunger is of a type wherein the plunger is biased upwardly by a spring (not shown) when the solenoid is not actuated. This upper bias of the plunger tends to rotate link 48 in a clockwise direction, thus, pivoting brake lever 34 outwardly against stop 46. When solenoid 68 is actuated, the solenoid plunger is pulled downwardly rotating link 48 counter-clockwise and pressing brake lever 34 and brake pad 44 against the rotating shaft. Thus, the solednoid can be actuated to prevent rotation of the shaft or the solenoid can be actuated to stop the shaft while rotating.

This completes the detailed description of the invention. While a preferred exemplary embodiment of the invention has been described herein there will be many changes and modifications which can be made to the invention by one skilled in the art to which this invention pertains, without departing from the spirit and scope of the invention as defined in the claims appended hereto.

We claim:
1. An anemometer comprising, in combination:
   (a) an instrument having a wind driven member mounted on a shaft journaled for rotation in a base member;
   (b) said base member including means for measuring the rotation rate of said shaft and generating an electric signal indicative of wind speed; and
   (c) a braking means mounted on said instrument for selectively preventing rotation of said shaft and thus said wind driven member, said braking means including:
      (1) a housing mounted on said base member in a position to surround a portion of said rotatably mounted shaft; and
      (2) a brake lever pivotally mounted to said housing for engagement with said rotating shaft to prevent movement of said wind driven member.
2. An anemometer as recited in claim 1 wherein: said brake lever has a brake pad mounted thereon which engages said rotating shaft upon actuation of said brake lever.
3. An anemometer as recited in claim 2 which further includes:
   (a) a link pivotally mounted on said housing;
   (b) said link having an arm connected to said brake lever whereby actuation of said link will bias said brake lever towards said rotating shaft.
4. An anemometer as recited in claim 3 which further includes:
   means for selectively actuating said link.
5. An anemometer as recited in claim 4 wherein said means for actuating said link is an electrically operated solenoid that is mounted on said housing and connected to said link.
6. An anemometer comprising, in combination:
   (a) an instrument having a wind driven member mounted on a rotating shaft journaled in a base,
   (b) said base including means for measuring the rotation rate of said shaft and generating an electric signal indicative of wind speed; and
   (c) a braking mechanism for immobilizing the wind driven member;
   (d) said braking mechanism including:
      (1) a housing positioned on said base and extending upwardly to surround a lower portion of said rotating shaft;
      (2) a brake lever having a brake pad bonded thereto, said brake lever being pivotally mounted to said housing;
      (3) a solenoid mounted on said housing; and
      (4) a link pivotally connected between said solenoid and said brake lever whereby actuation of said solenoid will bias said brake lever to a position wherein the brake pad will engage and immobilize the rotating shaft.

References Cited

UNITED STATES PATENTS

| | | | |
|---|---|---|---|
| 1,305,803 | 6/1919 | Irwin | 73—230 |
| 3,071,964 | 1/1963 | Hess | 73—189 |
| 3,363,464 | 1/1968 | Harringer et al. | 73—230 |

RICHARD C. QUEISSER, Primary Examiner

J. W. MYRACLE, Assistant Examiner